United States Patent [19]
Wang et al.

[11] Patent Number: 5,850,296
[45] Date of Patent: Dec. 15, 1998

[54] SCANNER HOUSING STRUCTURE

[75] Inventors: Oliver Wang; Hwang Chyi Lee, both of Taipei Hsien, Taiwan

[73] Assignee: Storm Technology, Inc., Mountain View, Calif.

[21] Appl. No.: 541,336

[22] Filed: Oct. 10, 1995

[51] Int. Cl.⁶ .................................................. H04N 1/04
[52] U.S. Cl. ........................ 358/474; 358/498; 358/496
[58] Field of Search .................. 358/474, 471, 358/400, 496, 498, 442, 500, 505; 348/836, 373, 374; 312/223.2, 223.1, 223.5, 330.1, 334.7, 334.16, 298; 361/683, 684, 685, 687

[56] References Cited

U.S. PATENT DOCUMENTS

| | | | |
|---|---|---|---|
| 5,122,459 | 5/1993 | Wu | 312/223.2 |
| 5,138,525 | 8/1992 | Rodriquez | 312/223.2 |
| 5,248,193 | 9/1993 | Schlemmer | 312/223.2 |
| 5,332,306 | 7/1994 | Babb et al. | 312/334.16 |
| 5,340,340 | 8/1994 | Hastings et al. | 312/223.1 |
| 5,397,176 | 3/1995 | Allen et al. | 312/223.2 |
| 5,460,441 | 10/1995 | Hastings et al. | 312/223.2 |
| 5,466,059 | 11/1995 | Liu | 312/223.2 |
| 5,469,037 | 11/1995 | McMurtrey et al. | 312/223.2 |
| 5,549,375 | 8/1996 | Pagliaccio | 312/223.2 |
| 5,612,794 | 3/1997 | Brandestini et al. | 358/505 |
| 5,663,812 | 9/1997 | Pan | 358/474 |
| 5,663,813 | 9/1997 | Pan | 358/474 |
| 5,742,407 | 4/1998 | Albrecht et al. | 358/474 |

*Primary Examiner*—Edward L. Coles
*Assistant Examiner*—Fan Lee
*Attorney, Agent, or Firm*—Knobbe, Martens, Olson & Bear LLP

[57] ABSTRACT

The present invention relates to a scanner housing structure which includes a scanner shell for mounting therein a scanning circuit, and the scanner housing structure is drawably mounted in a scanner-receiving space of a computer and allowed to be partially or completely drawn out of the scanner-receiving space. The scanner housing structure according to the present invention provides a more convenient environment in using a scanner, and the scanner can be a part of the computer so that no more effort of a user to choose and install a scanner is needed.

24 Claims, 6 Drawing Sheets

# SCANNER HOUSING STRUCTURE

FIELD OF THE INVENTION

The present invention relates to a scanner housing structure, and especially to a housing structure of a scanner drawably built in a computer.

BACKGROUND OF THE INVENTION

The informations to be processed and displayed in a computer today are not only text but also combination of text, sound and images altogether. Thus, image processing becomes very important in computer applications. However, the popular image processing device such as flatbed, hand-held or sheetfed scanner is still not one of the standard equipments of a personal computer. Additional requirements in choosing and installing a scanner for a computer make it inconvenient in use. If the scanner becomes one of the common peripheral equipments of a personal computer, there would be more users like to use image processing devices, and thus it will be helpful for the development of hyper-text informations.

SUMMARY OF THE INVENTION

An object of the present invention is to provide a housing structure of a scanner drawably built in a computer in order that the scanner can become one of the common peripheral equipments of the computer.

In accordance with the present invention, a scanner housing structure includes a scanner shell for mounting therein a scanning circuit, and the scanner housing structure is drawably mounted in a scanner-receiving space of a computer and allowed to be partially or completely drawn out of the scanner-receiving space.

In accordance with another aspect of the present invention, the scanner housing structure further includes a scanner-shell house which is to be secured in the scanner-receiving space for receiving the scanner shell in a manner that the scanner shell can be drawn out of the scanner-receiving space partially or completely.

The scanner-shell house according to the present invention includes: a main body secured in the scanner-receiving space of the computer, and having a guiding means therein for facilitating the movement of the scanner shell into and out of the scanner-receiving space; and a house floor engaged with the main body, and having a clutch means thereon for controlling the movement of the scanner shell. The guiding means can be two grooved rails installed on two opposite inner walls of the main body, respectively, while in this case, the scanner shell preferably includes two sliding pieces protruding from two opposite outer walls thereof, respectively, and the scanner shell is allowed to slide in and out of the scanner-receiving space by the two sliding pieces in cooperation with the two grooved rails. On the other hand, the clutch means can include: a doorlock device locking the scanner shell within the scanner-receiving space when the scanner shell is completely pushed into the scanner-shell house, and releasing to allow a move-out operation of the scanner shell when an additional force is exerted to the locked scanner shell; and a spring device mounted near the doorlock device for facilitating the move-out operation of the scanner shell by providing a spring force when the scanner shell is released from the doorlock device, while in this case, the scanner shell preferably includes an engaging device mounted on an outer bottom surface thereof to be engaged with the doorlock device when the scanner shell is completely pushed into the scanner-shell house.

In accordance with another aspect of the present invention, the house floor of the scanner-shell house includes two stopping pieces and the scanner shell includes two corresponding grooves for receiving the two stopping pieces in order to confine a move-out degree of the scanner shell with respect to the scanner-receiving space.

In accordance with another aspect of the present invention, the scanner shell includes a shell roof having thereon two openings respectively aligned with two driving rollers inside the scanner shell for partly protruding therefrom the two driving rollers. The scanner shell preferably further includes a pivotally liftable cover which is mounted on the shell roof and mounted thereon at least two driven rollers in cooperation with the driving rollers for transmitting an article to be scanned through the scanning circuit.

In accordance with another aspect of the present invention, the scanner shell further includes a front panel having thereon an entrance accessible to a passage between the driving rollers and driven rollers for feeding therefrom the article.

In another preferred embodiment of the present invention, the scanner shell includes two sliding pieces protruding from two opposite outer walls thereof, respectively, and the scanner shell is allowed to slide in and out of the scanner-receiving space by the two sliding pieces in cooperation with two grooved rails in the scanner-receiving space. The scanner shell further includes a front panel having thereon an entrance for feeding therefrom an article to be scanned and mounted thereon a drawing device for drawing the scanner shell out of the scanner-receiving space partially or completely.

The present invention may best be understood through the following description with reference to the accompanying drawings, in which:

The present invention may best be understood through the following description with reference to the accompanying drawings, in which:

DETAILED DESCRIPTION OF THE PREFERRED EMBODIMENTS

Figure 1:
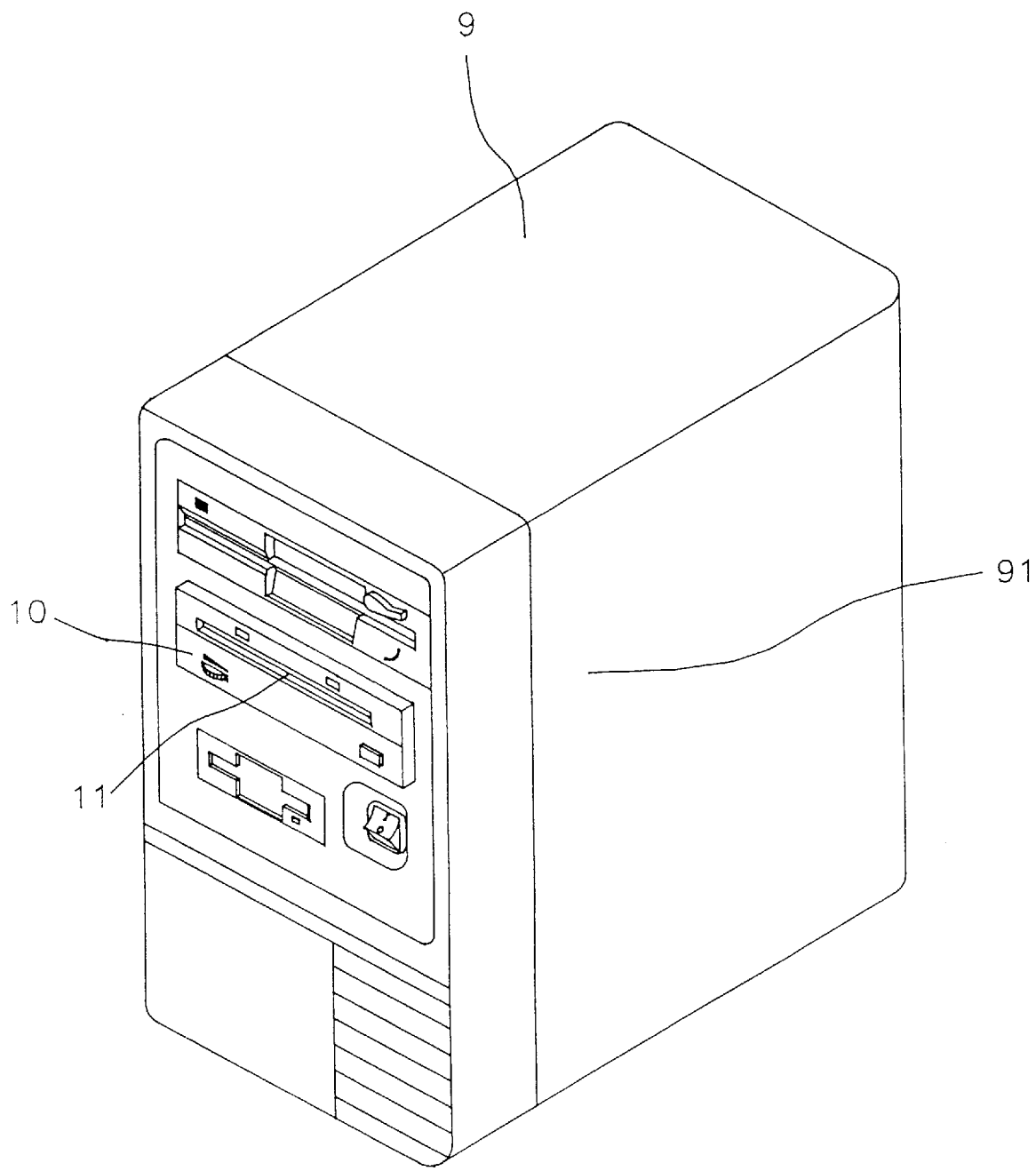
FIG. 1 is a perspective view schematically showing the installation of a scanner in a computer according to the present invention.

Please Refer to FIG. 1 which is a perspective view schematically showing the installation of a scanner in a computer according to the present invention. The scanner housing structure 10 of the scanner is drawably mounted in a receiving space 91 of the main frame housing 9 of the computer. There is an entrance 11 on a surface of the scanner housing structure 10 for feeding therefrom an article to be scanned. In this manner, the scanner can be a part of the computer and the scanning operation can be performed easily.

Figure 2:
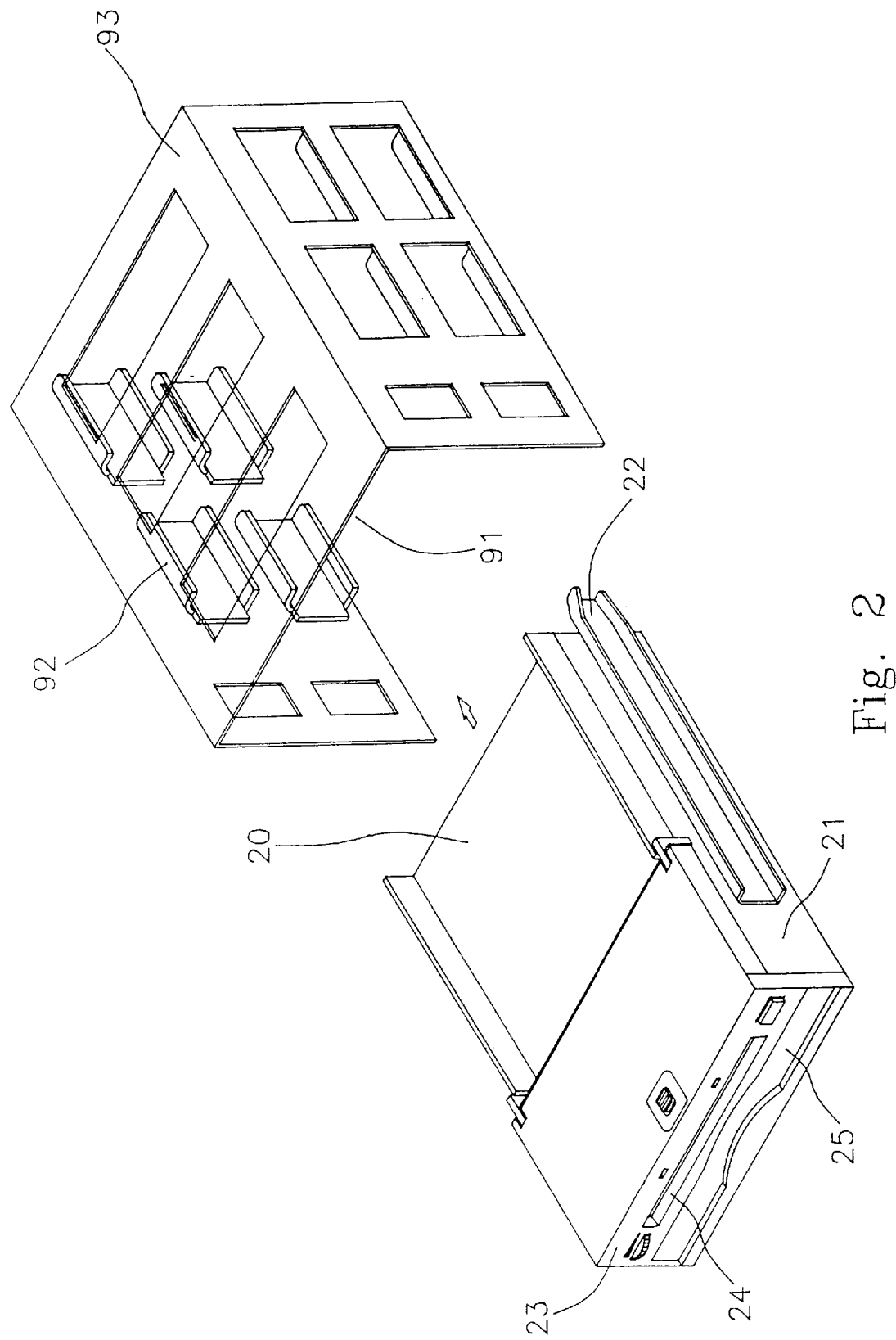
FIG. 2 is a perspective view schematically showing a preferred embodiment of a scanner housing structure according to the present invention and the preferred corresponding scanner-receiving space in a computer.

FIG. 2 illustratively shows how a scanner housing structure is installed into the receiving space of the computer. The scanner housing structure 20 includes two grooved sliding pieces 22 protruding from two opposite outer walls 21 thereof, respectively, and the scanner housing structure 20 is allowed to slide in and out of the scanner-receiving space 91 by the two sliding pieces 22 in cooperation with several grooved rails 92 in the scanner-receiving space 91. Of course, the sliding pieces 22 can also be a simple strip shape rather than the grooved shape. The scanner-receiving space 91 is constructed by a frame 93 fixed to the computer and the grooved rails 92 are mounted on the frame 93. The scanner housing structure 20 further includes a front panel 23 having thereon an entrance 24 for feeding therefrom an article to be scanned and mounted thereon a drawing device 25 for drawing the scanner shell out of the scanner-receiving space partially or completely.

Figure 3:
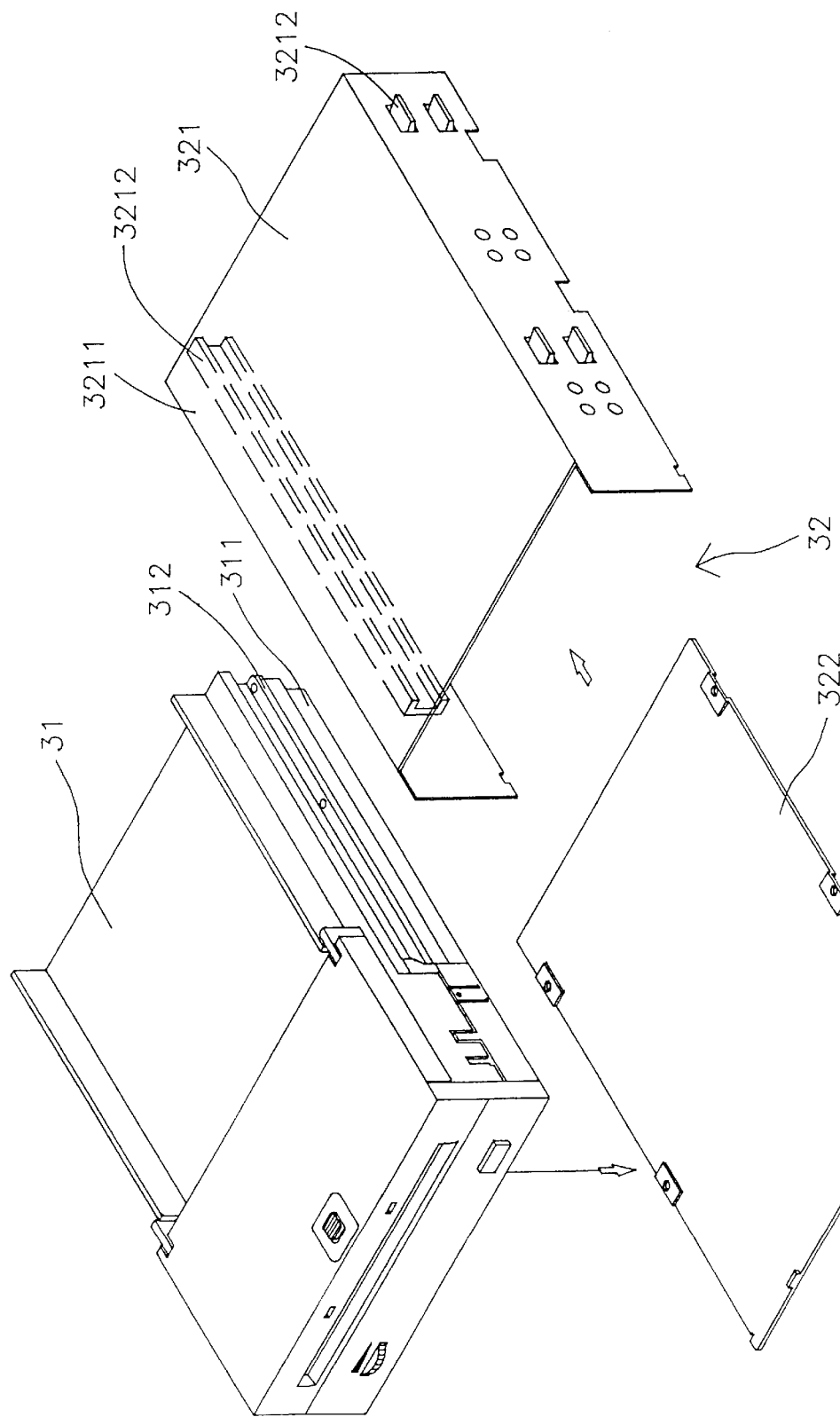
FIG. 3 is a perspective view schematically showing another preferred embodiment of a scanner housing structure according to the present invention.

Another preferred embodiment of a scanner housing structure according to the present invention is shown in FIG. 3 and it includes a scanner shell 31 and a scanner-shell house 32 which further includes a main body 321 and a house floor 322. The scanner shell 31 includes two sliding pieces 312 protruding from two opposite outer walls 311 thereof, respectively. The main body 321 is to be secured in the scanner-receiving space of the computer for receiving the scanner shell 31, and it has a guiding means 3212, e.g. two grooved rails, installed on two opposite inner walls 3211 of the main body 321, respectively. The scanner shell 31 is therefore allowed to slide in and out of the scanner-receiving space by the two sliding pieces 312 in cooperation with the two grooved rails 3212. When the scanner housing structure is to be mounted into the scanner-receiving space of the computer, the main body 321 is first for example screwed to the frame constructing the scanner-receiving space, then the house floor 322 is secured to the main body 321, and then the scanner shell having scanner circuit therein slides in along the rail tracks. Of course, the grooved rails 3212 can also be installed on the house floor 322 rather than the main body 321, and in this case, the sliding pieces 312 are mounted on the outer bottom surface of the scanner shell 31.

Figure 4:
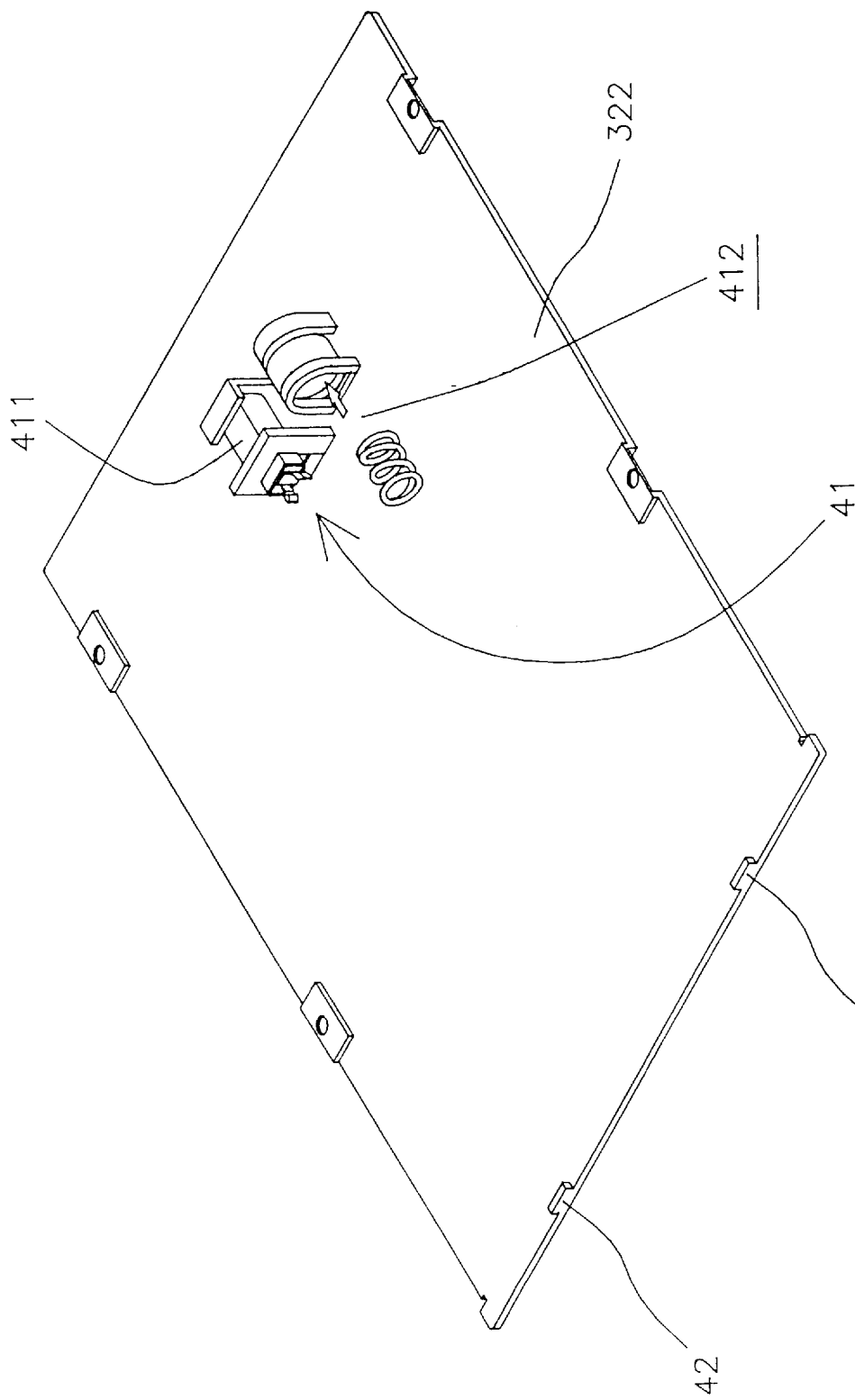
FIG. 4 schematically shows a variation of the house floor in FIG. 3.

The house floor 322 is preferably mounted thereon a clutch means 41, as shown in FIG. 4, for controlling the movement of the scanner shell 31, and preferably includes two stopping pieces 42 are preferably mounted on an edge of the house floor 322 in order to confine a move-out degree of the scanner shell 31 with respect to the scanner-receiving space. In such a case, the scanner shell 31 includes two grooves (as the numeral reference 59 shown in FIG. 5) corresponding to the two stopping pieces 42 for permitting the two stopping pieces 42 moving along the grooves and stopping at the end of the grooves. The clutch means 41 includes a doorlock device 411 locking the scanner shell 31 within the scanner-receiving space (as shown in FIG. 1) when the scanner shell is completely pushed into the scanner-shell house 32 (FIG. 3), and releasing to allow a move-out operation of the scanner shell 31 (as shown in FIG. 6) when an additional force is exerted to the locked scanner shell (as the numeral reference 10 shown in FIG. 1), and a spring device 412 mounted near the doorlock device 411 for facilitating the move-out operation of the scanner shell 31 by providing a spring force when the scanner shell 31 is released from the doorlock device 411. Of course, in this preferred embodiment, the scanner shell 31 preferably includes an engaging device (as the numeral reference 58 shown in FIG. 5) mounted on an outer bottom surface thereof to be engaged with the doorlock device 411 when the scanner shell 31 is completely pushed into the scanner-shell house 32.

Figure 5:
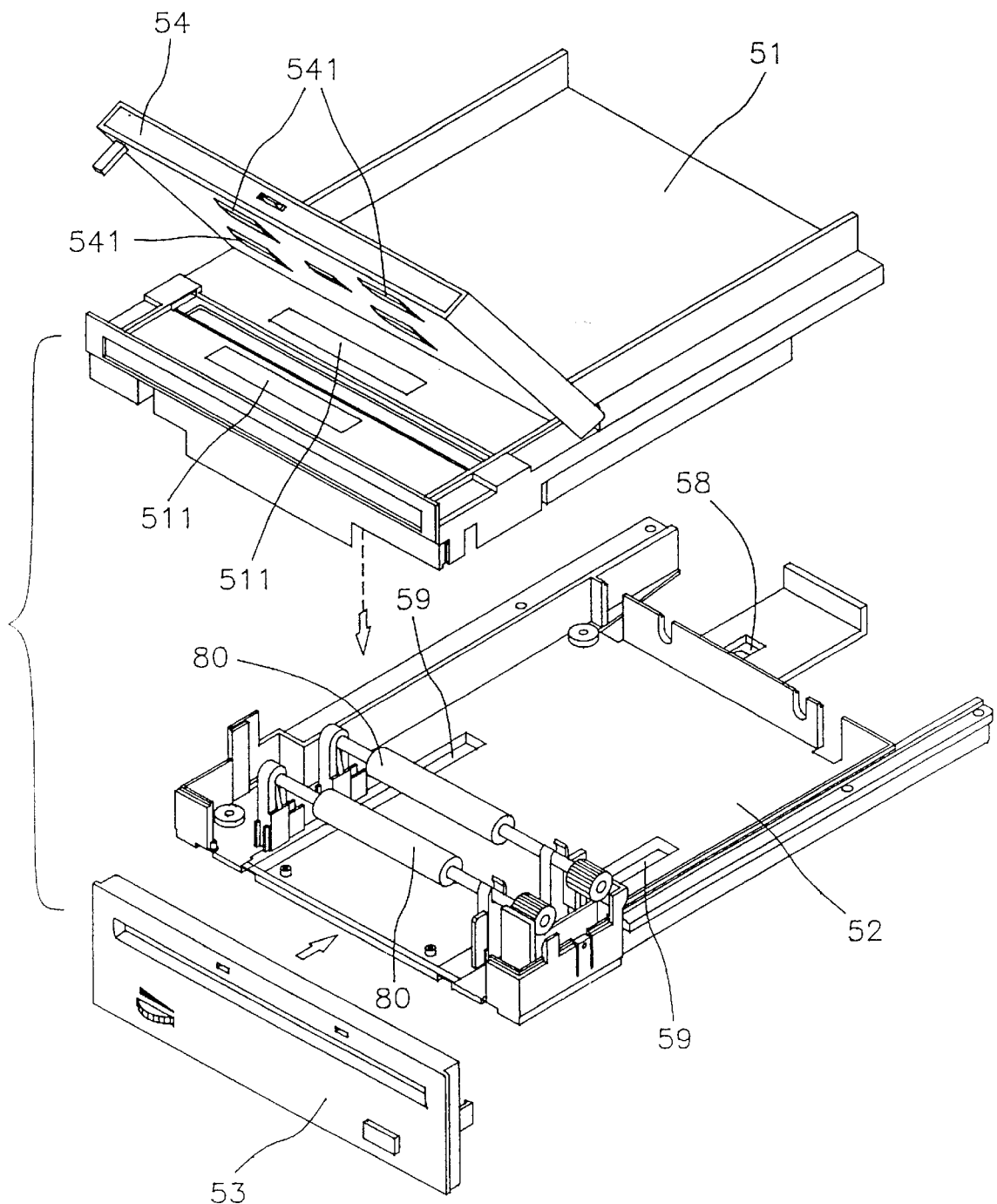
FIG. 5 is a schematic exploded diagram showing a preferred embodiment of the scanner housing structure in FIG. 2 or the scanner shell in FIG. 3.
Figure 6:
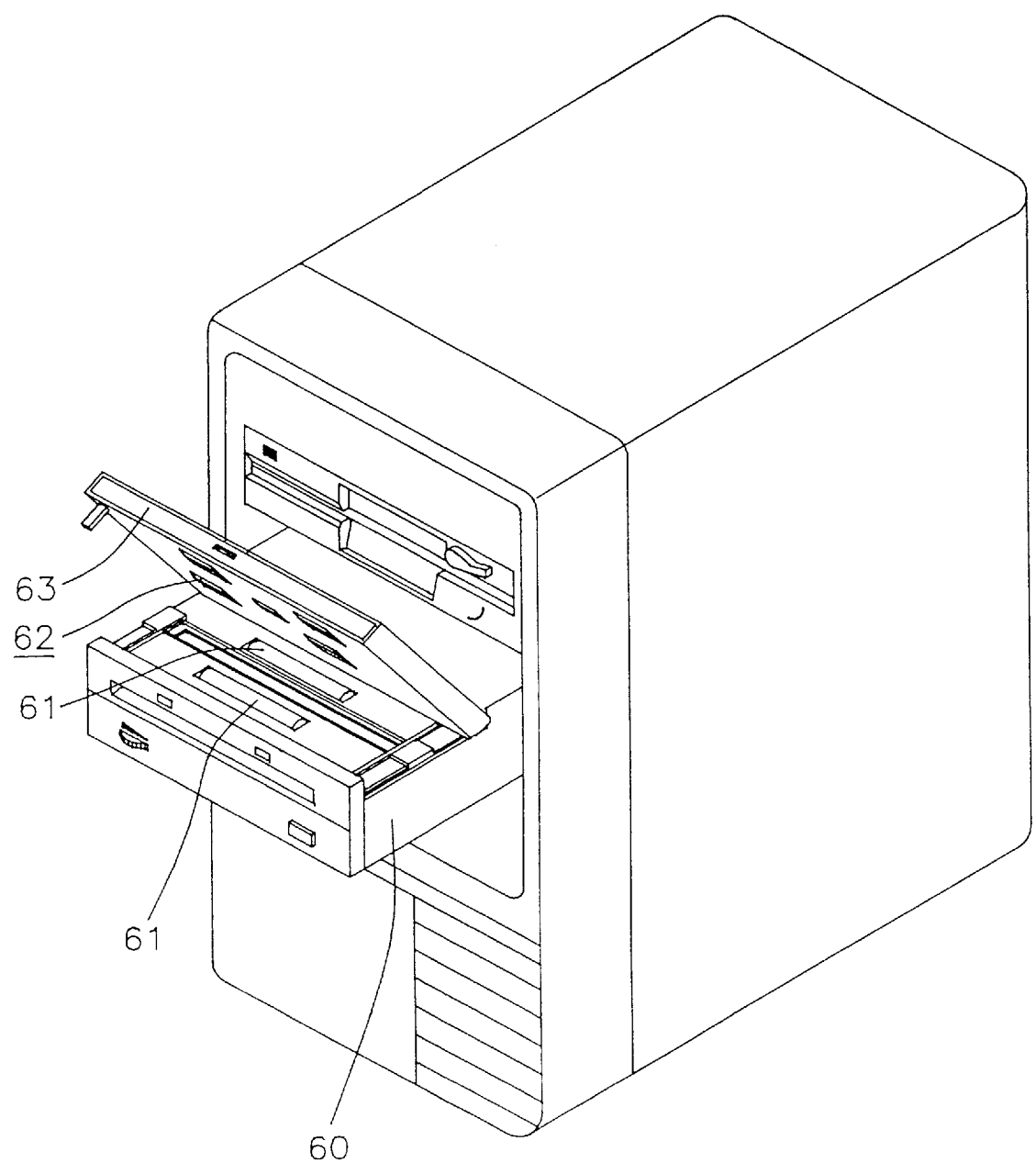
FIG. 6 is a perspective view schematically showing the installation of a scanner in a computer in a state that the scanner is partially drawn out of the scanner-receiving space of the computer.

Please refer to FIG. 5 which is a schematic exploded diagram showing a preferred embodiment of the scanner housing structure in FIG. 2 or the scanner shell in FIG. 3. The scanner shell shown in FIG. 5 includes a shell roof 51, a shell body 52 and a front panel 53. The shell roof 51 has thereon two openings 511 respectively aligned with two driving rollers 80 inside the shell body 52 for partly protruding therefrom the two driving rollers 80. The scanner shell further includes a pivotally liftable cover 54 which is mounted on the shell roof 51 and mounted thereon a plurality of driven rollers 541 in cooperation with the driving rollers 80 for transmitting an article to be scanned through the scanning circuit which is not shown for the purpose of simplification and clarification of the drawing.

When an scanning operation is performed, it is occasional the case that the fed article is jammed in the passage between the rollers, and thus the design for easily removing the jammed article is necessary for the built-in scanner. According to the present invention, the scanner is made drawable so that the jammed article can be removed by partially drawing the scanner out. As shown in FIG. 6 which schematically shows the installation of a scanner in a computer in a state that the scanner is partially draw out of the scanner-receiving space of the computer. When an article (not shown) is jammed between the rollers 61 and 62, the scanner 60 is partially drawn out to an extent that the cover 63 can be lifted, and then the jammed article can be drawn out of the scanner.

The scanner housing structure according to the present invention provides a more convenient environment in using a scanner. First of all, the scanner occupies no external space since it is built in the computer. In addition, the installation of a scanner in a computer means that the scanner can be a part of the computer so that no more effort of a user to choose and install a scanner is needed. Furthermore, the drawable design of the present scanner housing structure makes it easy in cleaning and dealing with the paper jams of the scanner.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scanner housing structure for a scanner circuit built in a computer, comprising a scanner shell for mounting therein said scanner circuit, said scanner housing structure being drawably mounted on two grooved rails mounted in a scanner-receiving space of said computer and allowed to be partially or completely drawn out of said scanner receiving space without manually accessing the interior of the computer to release the scanner circuit.

2. A scanner housing structure according to claim 1 further comprising a scanner-shell house which is to be secured in said scanner-receiving space for receiving said scanner shell in a manner that said scanner shell can be drawn out of said scanner-receiving space partially or completely.

3. A scanner housing structure according to claim 2, wherein said scanner-shell house includes:
 a main body secured in said scanner receiving space of said computer, and having said grooved rails mounted thereto for facilitating the movement of said scanner shell into and out of said scanner-receiving space; and
 a house floor engaged with said main body, and having a clutch means thereon for controlling the movement of said scanner shell.

4. A scanner housing structure according to claim 3 wherein said scanner shell includes two sliding pieces protruding from two opposite outer walls thereof, respectively, and said scanner shell is allowed to slide in and out of said scanner-receiving space by said two sliding pieces in cooperation with said two grooved rails.

5. A scanner housing structure according to claim 3 wherein said clutch means includes:
 a doorlock device locking said scanner shell within said scanner-receiving space when said scanner shell is completely pushed into said scanner-shell house, and releasing to allow a move-out operation of said scanner shell when an additional force is exerted to said locked scanner shell; and
 a spring device located adjacent to said doorlock device for facilitating said move-out operation of said scanner shell by providing a spring force when said scanner shell is released from said doorlock device.

6. A scanner housing structure according to claim 5 wherein said scanner shell includes an engaging device mounted on an outer bottom surface thereof to be engaged with said doorlock device when said scanner shell is completely pushed into said scanner-shell house.

7. A scanner housing structure according to claim 3 wherein said house floor of said scanner-shell house includes two stopping pieces and said scanner shell includes two corresponding grooves for receiving said two stopping pieces in order to define a move-out degree of said scanner shell with respect to said scanner-receiving space.

8. A scanner housing structure according to claim 1 wherein said scanner shell includes two sliding pieces protruding from two opposite outer walls thereof, respectively, and said scanner shell is allowed to slide in and out of said scanner-receiving space by said two sliding pieces in cooperation with two said grooved rails in said scanner-receiving space.

9. A scanner housing structure according to claim 8 wherein said scanner shell further includes a front panel having thereon an entrance for feeding therefrom an article to be scanned and mounted thereon a drawing device for drawing said scanner shell out of said scanner-receiving space partially or completely.

10. A scanner housing structure comprising a scanner shell for mounting therein a scanning circuit, said scanner housing structure being drawably mounted in a scanner-receiving space of a computer and allowed to be partially or completely drawn out of said scanner-receiving space, said scanner shell including a shell roof having thereon two openings respectively aligned with two driving rollers inside said scanner shell for partly protruding therefrom said two driving rollers.

11. A scanner housing structure according to claim 10 wherein said scanner shell further includes a pivotally liftable cover which is mounted on said shell roof and mounted thereon at least two driven rollers in cooperation with said driving rollers for transmitting an article to be scanned through said scanning circuit.

12. A scanner housing structure according to claim 11 wherein said scanner shell further includes a front panel having thereon an entrance accessible to a passage between said driving rollers and driven rollers for feeding therefrom said article.

13. A scanner housing structure comprising a scanner shell for mounting therein a scanning circuit, said scanner housing structure being drawably mounted in a scanner-receiving space of a computer and allowed to be partially or completely drawn out of said scanner-receiving space, said scanner shell including a shell roof having thereon two openings respectively aligned with two driving rollers inside said scanner shell for partly protruding therefrom said two driving rollers, wherein said scanner shell further includes a pivotally liftable cover which is mounted on said shell roof and mounted thereon at least two driven rollers in cooperation with said driving rollers for transmitting an article to be scanned through said scanning circuit.

14. A scanner housing structure according to claim 13 wherein said scanner shell further includes a front panel having thereon an entrance accessible to a passage between said driving rollers and driven rollers for feeding therefrom said article.

15. A method of mounting a scanner in a computer housing, comprising the steps of:
 providing a computer housing having a space therein;
 inserting a scanner housing into the space;
 inserting a scanner shell housing into said space;
 connecting a drawable mechanism to the scanner shell housing to allow an item connected to the mechanism to be drawn into and out of the scanner housing; and
 connecting a scanner to the mechanism so the scanner can be inserted into and withdrawn from the space an amount sufficient to remove a jammed article from the scanner.

16. A method as defined in claim 15, further comprising the step of placing a pivoted lid on one surface of the scanner to allow access to the inside of the scanner.

17. A method as defined in claim 15, further comprising the step of placing a pivoted lid on one surface of the scanner and mounting at least one roller in the lid and positioning that roller so it can cooperate with a roller in the scanner to move an article to be scanned when the lid is closed.

18. A scanner for use with a computer having a space therein sized for receiving a component to be placed in electronic communication with the computer, comprising:
 a scanner sized to fit within the space, the scanner having mounted thereto a sliding guide rail mechanism on opposing sides of the scanner to allow the scanner to be removably inserted into and removed at least partially from the space a distance sufficient to allow an article jammed in the scanner to be removed.

19. A scanner as defined in claim 18 wherein the scanner has a roller transport for positioning articles to be scanned.

20. A scanner as defined in claim 19 wherein at least one of the rollers for the transport is in a lid pivotally connected to the scanner, which lid can be opened to allow said jammed article to be removed.

21. A scanner as defined in claim 18, further comprising a shell housing sized to be inserted into said space and held in a fixed position relative to the computer, said shell housing connecting to the mechanism to allow the scanner to be inserted into and out of the shell housing.

22. A scanner for use with a computer having a space therein sized for receiving a component to be placed in electronic communication with the computer, comprising:

a scanner sized to fit within the space, the scanner having means comprising a pair of sliding guide rails on opposing sides of the scanner for removably inserting the scanner into and out of the space a distance sufficient to allow an article jammed in the scanner to be removed.

23. A scanner as defined in claim 22, further comprising at least one pivotally mounted roller means for transporting an article to be scanned while allowing movement of said sliding guide rails to gain access to the said roller means.

24. A scanner for use with a computer having a space therein sized for receiving a component to be placed in electronic communication with the computer, comprising:

a scanner sized to fit within the space, the scanner having mounted thereto a mechanism to allow the scanner to be removably inserted into and removed at least partially from the space a distance sufficient to allow an article jammed in the scanner to be removed, and a shell housing sized to be inserted into said space and held in a fixed position relative to the computer, said shell housing connecting to the mechanism to allow the scanner to be inserted into and out of the shell housing.

* * * * *